US012753854B2

(12) United States Patent
Akbari et al.

(10) Patent No.: US 12,753,854 B2
(45) Date of Patent: Oct. 6, 2026

(54) ACTUATED ELASTIC VALVES

(71) Applicants: Sartorius Stedim FMT SAS, Aubagne (FR); Trustees of Boston University, Boston, MA (US)

(72) Inventors: Samin Akbari, Lincoln, MA (US); Douglas Holmes, Jamaica Plain, MA (US); Yi Yang, West Newton, MA (US); Sanika Barve, Mason, OH (US); David James Bollard, Stow, MA (US)

(73) Assignees: Sartorius Stedim FMT SAS, Aubagne (FR); Trustees of Boston University, Boston, MA (US)

( * ) Notice: Subject to any disclaimer, the term of this patent is extended or adjusted under 35 U.S.C. 154(b) by 44 days.

(21) Appl. No.: 18/291,062

(22) PCT Filed: Aug. 8, 2022

(86) PCT No.: PCT/US2022/039670
§ 371 (c)(1),
(2) Date: Jan. 22, 2024

(87) PCT Pub. No.: WO2023/018633
PCT Pub. Date: Feb. 16, 2023

(65) Prior Publication Data

US 2025/0102070 A1 Mar. 27, 2025

Related U.S. Application Data

(60) Provisional application No. 63/231,116, filed on Aug. 9, 2021.

(51) Int. Cl.
*F16K 31/08* (2006.01)
*F16K 31/06* (2006.01)
*F16K 99/00* (2006.01)

(52) U.S. Cl.
CPC ........ *F16K 31/086* (2013.01); *F16K 31/0672* (2013.01); *F16K 31/08* (2013.01); *F16K 99/0015* (2013.01); *F16K 99/0046* (2013.01)

(58) Field of Classification Search
CPC .... F16K 31/086; F16K 31/0672; F16K 31/08; F16K 99/0015; F16K 99/0046
See application file for complete search history.

(56) References Cited

U.S. PATENT DOCUMENTS 3,900,029 A 8/1975 Melnick et al.
4,434,810 A * 3/1984 Atkinson ............ F16K 15/1471
137/493

(Continued)

FOREIGN PATENT DOCUMENTS

EP 3029324 A1 6/2018

OTHER PUBLICATIONS

Invitation to Pay Additional Fees for International Application No. PCT/US2022/039670 dated Oct. 17, 2022.

(Continued)

*Primary Examiner* — Umashankar Venkatesan
(74) *Attorney, Agent, or Firm* — Wolf, Greenfield & Sacks, P.C.

(57) ABSTRACT

Valves, systems, articles, and methods for controlling fluid flow are generally described. According to some aspects, valves that can move between an open configuration and a closed configuration in response to a change in magnetic field and/or voltage potential are provided. According to certain aspects, valves comprising elastic diaphragms comprising magnetic materials (e.g., an elastic composite material including magnetic nanoparticles or other magnetic materials dispersed in a matrix) and/or electroactive polymers are provided. In some aspects, magnetically actuated systems and/or voltage potential actuated systems compris- (Continued)

ing elastomeric valves are described. In some embodiments, valves and systems described herein are useful for liquid handling, dosing, and regulation of fluid flow, though embodiments in which the disclosed valves are used in different applications are also contemplated.

21 Claims, 9 Drawing Sheets

(56) References Cited

U.S. PATENT DOCUMENTS

| | | | | | |
|---|---|---|---|---|---|
| 5,222,522 | A * | 6/1993 | Rontome | A45C 11/005 | |
| | | | | 137/845 | |
| 5,261,459 | A * | 11/1993 | Atkinson | A61M 39/24 | |
| | | | | 137/846 | |
| 5,366,506 | A * | 11/1994 | Davis | A61F 2/0018 | |
| | | | | 623/23.66 | |
| 6,676,106 | B2 | 1/2004 | Swartz et al. | | |
| 8,388,908 | B2 | 3/2013 | Blaga et al. | | |
| 9,389,231 | B2 * | 7/2016 | Edwards | B01L 3/502738 | |
| 9,845,895 | B2 * | 12/2017 | Tai | F16K 15/145 | |
| 10,240,689 | B2 * | 3/2019 | Tai | B29C 70/766 | |
| 10,400,915 | B2 * | 9/2019 | Nath | F04D 15/0005 | |
| 11,098,824 | B2 * | 8/2021 | Parent | F16K 11/22 | |
| 2004/0033146 | A1 * | 2/2004 | Dai | F04B 53/1057 | |
| | | | | 417/413.2 | |
| 2007/0254278 | A1 | 11/2007 | DeSimone et al. | | |
| 2008/0094456 | A1 | 4/2008 | Miyajima et al. | | |
| 2008/0277607 | A1 * | 11/2008 | Sawai | F16K 31/02 | |
| | | | | 251/65 | |
| 2012/0211095 | A1 * | 8/2012 | Peck | F16K 15/145 | |
| | | | | 137/511 | |
| 2012/0323318 | A1 | 12/2012 | Yusuf et al. | | |
| 2019/0072086 | A1 | 3/2019 | Ducharme et al. | | |

OTHER PUBLICATIONS

International Search Report and Written Opinion for International Application No. PCT/US2022/039670 dated Dec. 28, 2022.

International Preliminary Report on Patentability (Chapter 1) for International Application No. PCT/US2022/039670 dated Feb. 22, 2024.

Stein-Montalvo et al., Efficient snap-through of spherical caps by applying a localized curvature stimulus. Eur Phys J E Soft Matter. Jan. 13, 2022;45(1):3. doi: 10.1140/epje/s10189-021-00156-0.

Taffetani et al., Static bistability of spherical caps. Proc R Soc A. May 16, 2018;474(2213):20170910. doi: 10.1098/rspa.2017.0910.

PCT/US2022/039670, Oct. 17, 2022, Invitation to Pay Additional Fees.

PCT/US2022/039670, Dec. 28, 2022, International Search Report and Written Opinion.

PCT/US2022/039670, Feb. 22, 2024, International Preliminary Report on Patentability (Chapter 1).

* cited by examiner

ACTUATED ELASTIC VALVES

CROSS-REFERENCE TO RELATED APPLICATIONS

This application is a national stage filing under 35 U.S.C. § 371 of International Patent Application Serial No. PCT/US2022/039670, filed Aug. 8, 2022, which claims the benefit of priority under 35 U.S.C. § 119(e) of U.S. Provisional Application Ser. No. 63/231,116, filed Aug. 9, 2021, the disclosures of each of which are incorporated herein by reference in their entirety.

TECHNICAL FIELD

Embodiments related to actuated elastic valves are generally described.

BACKGROUND

Valves are used for selectively controlling the flow of fluid from and/or between different components of a system. For example, valves are often times used for controlling the flow of fluid between various portions of a reactor. However, valves are oftentimes bulky, expensive, and/or complicated. For example, valves often include large bulky parts and/or multiple complex interacting components.

SUMMARY

Valves, systems, articles, and methods for controlling fluid flow are generally described. According to some aspects, valves that can move between an open configuration and a closed configuration in response to a change in magnetic field and/or an applied voltage potential are provided. According to certain aspects, valves comprising elastic diaphragms comprising magnetic materials (e.g., an elastic composite material including magnetic nanoparticles or other magnetic materials dispersed in a matrix) are provided. In some aspects, valves comprising elastic diaphragms comprising electroactive polymers are provided. In some aspects, magnetically actuated systems and or voltage actuated systems comprising elastomeric valves are described. In some embodiments, valves and systems described herein are useful for liquid handling, dosing, and regulation of fluid flow, though embodiments in which the disclosed valves are used in different applications are also contemplated.

The subject matter of the present disclosure involves, in some cases, interrelated products, alternative solutions to a particular problem, and/or a plurality of different uses of one or more systems and/or articles.

According to one aspect, a valve is provided. In some embodiments, the valve comprises: an elastic diaphragm configured to move between an open configuration and a closed configuration, wherein at least a portion of the elastic diaphragm comprises a magnetic material, and wherein the elastic diaphragm is configured to transition from the closed configuration to the open configuration when a magnetic field applied to the elastic diaphragm is altered.

In another aspect, a valve is provided. In some embodiments, the valve comprises: an elastic diaphragm configured to move between an open configuration and a closed configuration, wherein at least a portion of the elastic diaphragm comprises an electroactive polymer, and wherein the elastic diaphragm is configured to transition from the closed configuration to the open configuration when a voltage potential applied to the elastic diaphragm is altered.

In yet another aspect, a system is provided. The system may comprise: a vessel configured to contain a fluid; a valve comprising an elastic diaphragm configured to move between an open configuration and a closed configuration in fluid communication with the vessel, wherein at least a portion of the elastic diaphragm comprises a magnetic material, and wherein the elastic diaphragm is configured to transition from the closed configuration to the open configuration when a magnetic field is applied to the elastic diaphragm; and a magnet configured to alter the magnetic field applied to the elastic diaphragm to transition the valve to the open configuration to permit the fluid to flow from the vessel through the valve.

In another aspect, a system is provided. The system may comprise: a vessel configured to contain a fluid; a valve comprising an elastic diaphragm configured to move between an open configuration and a closed configuration in fluid communication with the vessel, wherein at least a portion of the elastic diaphragm comprises an electroactive polymer; and a voltage source configured to alter a voltage potential applied to the elastic diaphragm to transition the valve between the open configuration and a closed configuration to selectively permit the fluid to flow from the vessel through the valve.

In one aspect, a method of operating a valve is provided. The method may comprise: applying a magnetic field to an elastic diaphragm of a valve, wherein at least a portion of the elastic diaphragm comprises a magnetic material; and deforming the elastic diaphragm in response to the applied magnetic field to transition the valve from a closed configuration to an open configuration.

In another aspect, a method of operating a valve is provided. The method may comprise: applying a voltage potential to an elastic diaphragm of a valve, wherein at least a portion of the elastic diaphragm comprises an electroactive polymer; and deforming the elastic diaphragm in response to the voltage potential to transition the valve from a closed configuration to an open configuration.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Figure 1A:
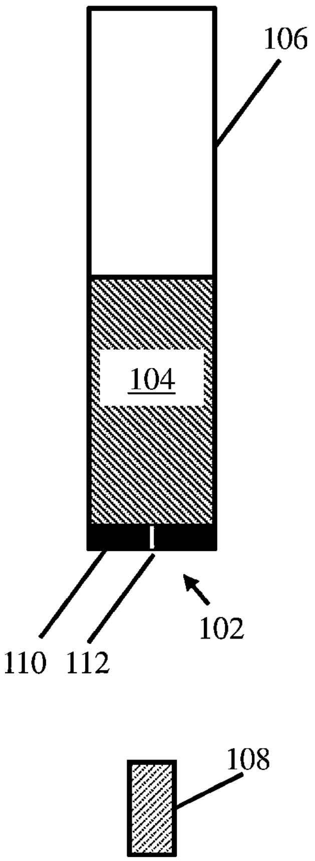
FIG. 1A depicts one embodiment of a valve including an elastic diaphragm in a first, closed configuration with a magnet spaced from the valve.

For some applications, it may be desirable to provide simple and/or inexpensive fluidic systems and components while still providing effective fluid control. However, many valves commonly used in fluidic systems are complex and/or expensive, which may limit their utility for certain uses including, for example, single-use applications. Moreover, many valves used in fluidic systems may be bulky and/or dense, which may render them unsuitable for fluidic systems intended to be lightweight, single use, or small in size.

In view of the above, the inventors have recognized the benefits associated with valves, systems, and methods that enable the control of fluid flows using magnetic fields and/or voltage potentials, according to some embodiments. In some embodiments, the valves and systems described herein comprise an elastic diaphragm that includes a magnetic material. According to some embodiments, a magnetic field applied to the magnetic material of the valve can be varied to vary a force applied to the magnetic material. In some embodiments, the elastic diaphragm comprises an electroactive polymer. According to some embodiments, a voltage potential applied to the electroactive polymer can be varied to vary a force applied to the electroactive polymer. Accordingly, applying or altering a magnetic field and/or voltage potential applied to an elastic diaphragm can cause the elastic diaphragm to move between an open configuration and a closed configuration, thus controlling the flow of fluid through the valve. For example, the elastic diaphragm may be deformed into the open configuration to either open and/or unseal one or more openings through which a fluid may flow in response to the applied magnetic field and/or voltage potential when transitioning from the closed configuration to the open configuration Elaborating on the above, in some embodiments, the transition from the closed configuration to the open configuration may permit flow through the valve. Correspondingly, the transition from the open configuration to the closed configuration may prevent flow through the valve. According to some embodiments, the elastic diaphragm is biased towards the closed configuration. In cases of bias towards the closed configuration, the magnetic field strength experienced by the valve when the elastic diaphragm is in the open configuration may be greater than the magnetic field strength experienced by the valve when the elastic diaphragm is in the closed position, according to some embodiments. For example, a slit valve may be moved from the closed configuration to the open configuration when moved close to a magnet. According to some embodiments, the elastic diaphragm is biased towards the open configuration. In cases of bias towards the open configuration, the magnetic field strength experienced by the valve when the elastic diaphragm is in the closed configuration may be greater than the magnetic field strength experienced by the valve when the elastic diaphragm is in the open position, according to some embodiments. For example, according to some embodiments, an electromagnet positioned within an appropriate distance and orientation of an elastic diaphragm may be turned off when an umbrella valve is in the open configuration, and subsequently turned on to move the elastic diaphragm to the closed configuration.

Similar to the above, a valve may be biased towards the open or closed configuration, but the valve may include an electroactive polymer. In such an embodiment, the valve may transition between the open and closed configurations based on a change in the voltage potential applied to the electroactive polymer. In embodiments where a valve is biased towards the closed configuration, the voltage potential applied to the valve when the elastic diaphragm is in the open configuration may be greater than the voltage potential applied to the valve when the elastic diaphragm is in the closed position. For example, a slit valve may be moved from the closed configuration to the open configuration when the voltage potential applied to the slit valve is increased. Of course, embodiments in which the elastic diaphragm is biased towards the open configuration are also contemplated as the disclosure is not so limited. The voltage potential applied to a valve may be altered in multiple ways.

For example, in some embodiments, a membrane of a valve may comprise one or more electrode layers enclosing an electroactive polymer, such that a voltage potential may be produced across the electroactive polymer by connecting a power source to the electrodes. According to certain embodiments, the power source may be connected to one or more electrodes not contacting the electroactive polymer. In some embodiments, the voltage potential may be changed by changing a position of the valve relative to a statically charged surface.

According to some embodiments, a valve may include a body. The body may comprise one or more through-holes formed in a portion of the body extending from an inlet to an outlet of the valve. In some embodiments, the elastic diaphragm is configured to cover and seal the one or more through-holes in the closed configuration, to prevent flow through the one or more through holes. In the open configuration, the elastic diaphragm may be spaced from the one or more through holes such that there is a flow path extending through the one or more through holes and past the elastic diaphragm, to permit flow through the valve. Of course, while a particular configuration with the elastic diaphragm covering one or more through holes formed in a separate body are discussed above, embodiments in which a valve including an elastic diaphragm with one or more openings, such as slits, formed in the elastic diaphragm such that the elastic diaphragm is deformed to open and close by the applied magnetic field are also contemplated as disclosed further below.

In some embodiments, a valve may be broadly classified as an umbrella valve. In some embodiments, the elastic diaphragm is, in the closed configuration, positioned against and sealing the one or more through-holes of the body. When the elastic diaphragm is in the open configuration, the elastic diaphragm may be spaced from the one or more through-holes. An umbrella valve may also comprise a stem, attached to the elastic diaphragm. The stem may also be connected to the body, such that the elastic diaphragm is connected to the body via the stem. Depending on the embodiment, the stem may extend completely through the body, in some embodiments. However, in other embodiments, the stem does not completely extend through the body, but rather may be anchored within the body.

In some embodiments, a valve may be broadly classified as a slit valve. According to some embodiments, an elastic diaphragm of a valve includes one or more slits formed in the elastic diaphragm, where the slits correspond to an opening extending from a first surface of the elastic diaphragm to a second opposing surface of the elastic diaphragm opposite from the first surface, where the sides of the slits may either be in contact with one another in the closed configuration and/or are closely spaced relative to one another, such that a liquid in contact with the slit is unable to flow through the closed slit due to surface tension. It should be understood that any appropriate number of slits may be used, and that the slits may exhibit any appropriate shape for a desired application. In either case, the one or more slits may be configured to open when the desired opening magnetic field is applied, deforming the elastic diaphragm into the open configuration such that the liquid is then able to flow through the wider slits in the open configuration. According to some embodiments, the elastic diaphragm, and the one or more slits are biased towards the closed configuration. Depending on the desired application, the magnetic force may be applied from either side of the valve.

For the sake of clarity, a majority of the embodiments described herein are disclosed relative to a valve that is biased towards the closed configuration. However, the current disclosure is not limited in this fashion. For example, in some embodiments, a valve may be biased towards an open configuration in the absence of a magnetic field, and the applied magnetic field may transition the valve to the closed configuration. Accordingly, it should be understood that any of the embodiments disclosed herein may either be biased to the closed configuration or to the open configuration in the absence of an applied magnetic field as the disclosure is not limited in this fashion.

According to some embodiments, the one or more slits of a valve are linear and may intersect one another. For example, two or more slits may intersect at a single point, in some embodiments. The slits may either all have the same length, or they may have different lengths. In some embodiments, a pattern of the slits may have rotational symmetry, such that the slits extend radially outwards from the point of intersection and may be evenly distributed around the point of intersection by any appropriate angle, but not limited to, an angle of 15°, 30°, 45°, 60°, 90°, or 120°. Of course, any appropriate shape, size, number, and/or distribution of slits may be used as the disclosure is not so limited.

Valves corresponding to the various embodiments disclosed herein may be configured to provide any desired flow rate for a desired application. However, in some embodiments, a valve is configured to permit a fluid flow at a rate of greater than or equal to 0.1 mL/min, greater than or equal to 0.5 mL/min, greater than or equal to 1 mL/min, greater than or equal to 2 mL/min, greater than or equal to 5 mL/min, greater than or equal to 10 mL/min, greater than or equal to 20 mL/min, greater than or equal to 30 mL/min, greater than or equal to 45 mL/min, greater than or equal to 60 mL/min, or greater. In some embodiments, the valve is configured to permit a fluid flow of less than or equal to 500 mL/min, less than or equal to 200 mL/min, less than or equal to 100 mL/min, less than or equal to 50 mL/min, less than or equal to 25 mL/min, or less. Combinations of these ranges are possible. For example, in some embodiments, the valve is configured to permit a fluid flow of greater than or equal to 0.1 mL/min and less than or equal to 500 mL/min.

In some embodiments, a rate of fluid flow may depend on a magnetic flux density and/or a voltage potential applied to a valve. For example, a change in a magnetic flux density and/or a voltage potential may change a rate of fluid flow, e.g., by causing a valve to open wider, or by allowing an open valve to partially close. Thus, in some embodiments, when a first magnetic field and/or voltage potential is applied to the valve, the valve may exist in a first state, wherein it is configured to permit fluid flow at a first rate as described above. In some embodiments, when a second magnetic field and/or voltage potential is applied to the valve, the valve may exist in a second state, wherein it is configured to permit fluid flow at a second rate as described above. A skilled artisan could construct a valve where an increase in magnetic flux density and/or voltage potential applied to a valve resulted in an increase in the flow rate through the valve; however, a skilled artisan could also construct a valve where a decrease in magnetic flux density and/or voltage potential applied to a valve may result in an increase in the flow rate through the valve as the disclosure is not limited in this way. In some embodiments, a flow rate may change continuously during a change in a configuration of a valve between an open configuration and a closed configuration. However, a flow rate may also change discontinuously.

The above flow rates may be for any desired pressure head based on a desired application. Additionally, the fluid may be liquid water or other aqueous solutions.

Valves described herein may comprise any suitable material. In various embodiments, an elastic diaphragm of a valve may include an elastomeric material, magnetic materials, electroactive polymers, and/or combinations of the forgoing. For example, in one embodiment, an elastic diaphragm comprises both elastomers and magnetic materials, as described in more detail herein. In some embodiments, an elastic diaphragm comprises an electroactive polymer which may or may not be an elastomer, and optionally a separate elastomer that is not an electroactive polymer. In some embodiments, the valve comprises an elastomer, an electroactive polymer, and a magnetic material. Accordingly, depending on the particular materials used to form an elastic diaphragm in a particular embodiment, electromagnetic fields, magnetic fields, and/or voltage potentials may be used to control the transition between an open and closed configuration of the elastic diaphragm.

In some embodiments, an elastic diaphragm of a valve comprises an elastomer. The elastomer may be any suitable elastomeric polymer. For example, according to some embodiments, the elastomer may be silicone, rubber (e.g., polyisoprene, neoprene), polyvinylsiloxane (PVS), polydimethylsiloxane (PDMS), combinations of the forgoing, and/or any other appropriate elastomer as the disclosure is not so limited.

According to some embodiments, the elastomer may experience a high elastic strain during operation as an elastic diaphragm at least partially made from the elastomer transitions between an open and closed configuration. For example, according to some embodiments, the elastomer can experience an elastic strain of greater than or equal to 30%, greater than or equal to 40%, greater than or equal to 50%, greater than or equal to 75%, greater than or equal to 100%, or any other appropriate elastic strain. Correspondingly, the elastomer of an elastic diaphragm may be configured to undergo elastic strains that are less than or equal to 200%, 100%, 75%, 50%, 40%, and/or any other appropriate elastic strain during operation. Combinations of the foregoing are contemplated including, for example, an elastomer and/or corresponding elastic diaphragm that are configured to undergo elastic strains that are between or equal to 30% and 200% during operation. Of course, elastic strains both greater than and less than those noted above are also contemplated as the disclosure is not limited in this fashion.

In some embodiments, elastomers as described herein may have a relatively low elastic modulus. According to some embodiments, the elastomer has an elastic modulus of less than or equal to 20 MPa, less than or equal to 15 MPa, less than or equal to 10 MPa, less than or equal to 5 MPa, less than or equal to 2 MPa, less than or equal to 1 MPa, or less. According to some embodiments, the elastomer has an elastic modulus of greater than or equal to 500 kPa, greater than or equal to 1 MPa, or greater. Combinations of these ranges are possible. For example, according to some embodiments the elastomer has an elastic modulus of greater than or equal to 500 kPa and less than or equal to 20 MPa. The elastic modulus of the material is a well-known parameter and may either be a known material parameter for a given material or may be measured using any appropriate method including, but not limited to, tensile testing methods, ultrasonic testing methods, and/or any other appropriate testing method.

According to some embodiments, at least a portion of the elastic diaphragm comprises one or more magnetic materials. This magnetic material may either be attached to, integrated with, and/or dispersed within a material of the elastic diaphragm, such that the elastic diaphragm may be transitioned between an open and closed configuration by an applied magnetic field as elaborated on further herein. Any appropriate magnetic material capable of applying a force to the elastic diaphragm under an applied magnetic field may be used. For example, according to some embodiments, the magnetic material is a ferromagnetic material. In some embodiments, the magnetic material is a ferrimagnetic material. However, embodiments in which the magnetic material is a paramagnetic material, a permanently magnetized material, and/or any other appropriate magnetic material capable of interacting with an applied magnetic field to open and close the valve are also contemplated, as the disclosure is not limited in this fashion.

The magnetic material may be an elemental metal, such as Fe, Co, Ni, Gd, Tb, Mn, Nd, and Dy, or an alloy comprising one or more of these elemental metals. For example, magnetic material may be an intermetallic, such as $Nd_2Fe_{14}B$, MnBi, MnSb, or MnAs. The magnetic material may also be a metal oxide, such as $Fe_2O_3$, $Fe_3O_4$, $NiFe_2O_4$, $CuFe_2O_4$, $MgFe_2O_4$, $MnFe_2O_4$, $Y_3Fe_5O_{12}$, or EuO. The magnetic material may also comprise mixtures of these, (e.g., in the case of a multiphase magnetic material, such as a metal with an oxidized surface or a metal alloy comprising an intermetallic phase). The magnetic material comprises 1, 2, 3, or more thermodynamic phases, according to some embodiments. Of course, while specific types of magnetic materials are listed above, it should be understood that the current disclosure is not limited to any particular type of magnetic material.

While a magnetic material may be provided in any desired form for a particular application, in some embodiments, a magnetic material comprises magnetic particles or nanoparticles suspended in a polymer matrix used to form at least a portion, and in some instances an entirety, of an elastic diaphragm of a valve. While any appropriately sized particles may be used, the use of magnetic nanoparticles may advantageously result in a more uniform distribution of the magnetic material within the elastic diaphragm. For example, magnetic nanoparticles may be less prone to aggregation, relative to larger particles, during the formation of the elastic diaphragm. This may advantageously homogenize the force from the magnetic field across the elastic diaphragm, thus allowing more precise, uniform, and/or repeatable regulation of fluid flow.

Depending on the desired application, the magnetic particles used to form a valve may have any appropriate average maximum transverse dimension (e.g., a maximum diameter). For example, in some embodiments, the magnetic particles have an average maximum transverse dimension of greater than or equal to 5 nm, greater than or equal to 10 nm, greater than or equal to 20 nm, greater than or equal to 40 nm, greater than or equal to 50 nm, greater than or equal to 75 nm, greater than or equal to 100 nm, greater than or equal to 200 nm, greater than or equal to 300 nm, or greater. According to some embodiments, the magnetic particles have an average maximum transverse dimension of less than or equal to 5000 nm, less than or equal to 2000 nm, less than or equal to 1000 nm, less than or equal to 500 nm, less than or equal to 200 nm, or less. Combinations of these ranges are possible. For example, according to some embodiments the magnetic particles have an average maximum transverse dimension of greater than or equal to 5 nm and less than or equal to 5000 nm. As a more specific example, according to some embodiments the magnetic particles have a maximum transverse dimension of greater than or equal to 5 nm and less than or equal to 500 nm. Of course, ranges both greater than and less than those noted above are also contemplated as the disclosure is not limited in this fashion. The average maximum transverse dimension of the particles may be measured in any appropriate fashion, including, for example, using image analysis techniques using images acquired with optical and/or scanning electron microscope imaging as well as any other appropriate characterization technique.

According to some embodiments, magnetic particles may be included in a composite with a polymer matrix in any desired concentration. For example, a composite material used to form at least a portion of an elastic diaphragm of a valve may include magnetic particles in a concentration that is greater than or equal to 1 weight percent (wt %), greater than or equal to 5 wt %, greater than or equal to 10 wt %, greater than or equal to 15 wt %, greater than or equal to 20 wt %, or more of the elastic diaphragm. According to some embodiments, the magnetic particles may be present in a concentration that is less than or equal to 75 wt %, the magnetic nanoparticles comprise less than or equal to 50 wt %, less than or equal to 30 wt %, less than or equal to 20 wt %, less than or equal to 10 wt %, less than or equal to 5 wt %, less than or equal to 2 wt %, or less of the elastic diaphragm. Combinations of these ranges are possible. For example, according to some embodiments, the magnetic particles may be present in a concentration that is greater than or equal to 1 wt % and less than or equal to 75 wt % of the elastic diaphragm. Of course, concentrations both greater than and less than those noted above are contemplated as the disclosure is not limited in this fashion.

In some embodiments, a magnetic material, such as magnetic particles and/or magnetic nanoparticles, may be dispersed within the elastic diaphragm. For example, according to some embodiments, the magnetic material is uniformly dispersed within a polymer matrix. Uniform dispersal of the magnetic material may be accomplished by any suitable method during the manufacture of the elastic diaphragm. For example, according to some embodiments, the magnetic material may be uniformly dispersed within a resin (e.g., an elastomer resin) that may be cured to form the polymer matrix with the magnetic particles suspended therein. According to some embodiments, it may be advantageous to mix the resin, in order to more uniformly disperse the magnetic material. Mixing of the resin may be accomplished by any suitable method. For instance, in some embodiments, the resin may be mixed using ultrasonic mixing. However, embodiments in which the resin is mixed using a mechanical mixer (e.g., using a blade mixer or a stir bar), manually (e.g., by hand-stirring with a stirring rod), and/or using any other appropriate mixing method are also contemplated. Mixing of the resin can, according to some embodiments, help to prevent the aggregation of the magnetic material particles during manufacture (e.g., by limiting the size of formed aggregates).

While elastic diaphragms including uniform distribution of magnetic materials therein are discussed above, it should be understood that in some embodiments, the magnetic material contained within an elastic diaphragm of a valve may be non-uniform. For example, as noted previously, a magnetic material may be fabricated separately from at least a first portion of an elastic diaphragm that the magnetic material is then connected to during the manufacturing process. According to some embodiments, the magnetic material is a ring connected to an elastic diaphragm. Of course, any other appropriate construction may also be used.

A non-uniform distribution of magnetic material may be advantageous in some applications. For example, an elastic diaphragm comprising a ring of magnetic material may be useful in an umbrella valve, where transitioning between the closed configuration and the open configuration may be influenced more by the magnetic force applied to the outer portion of a cap of the umbrella valve as compared to an inner portion of the cap.

An elastic diaphragm for use in the various embodiments described herein may be produced by any appropriate method. For example, according to some embodiments, the elastic diaphragm may be produced by resin casting, compression molding, transfer molding, injection molding, latex dipping, or additive manufacturing. These techniques may be used alone or in combination, and may be combined with additional shaping techniques such as cutting or shaving to achieve the appropriate geometry. According to some embodiments, the elastic diaphragm comprises a single layer. However, according to some embodiments, the elastic diaphragm is multi-layered. For example, the elastic diaphragm comprises 2, 3, 4, 5, or more layers, according to some embodiments. These may have the same composition, or they may have different compositions (e.g., they may have different concentrations of the magnetic material, different polymers, and/or any other appropriate compositional difference).

As noted above, in some embodiments, at least a portion of an elastic diaphragm comprises one or more electroactive polymers. Generally, electroactive polymers change shape or size in response to a voltage potential. In some embodiments, the electroactive polymer responds to the voltage potential as a result of electrostatic forces. For example, in some embodiments, the electroactive polymer may comprise a dielectric elastomer, which can experience strain due to compression of the dielectric elastomer due to an electrostatic attraction between electrodes on opposite sides of the dielectric elastomer. The dielectric elastomer, according to certain embodiments, is an elastomer as described above, which additionally has a relatively high dielectric constant (e.g., a dielectric constant greater than or equal to 1.5, greater than or equal to 2, greater than or equal to 3, greater than or equal to 4, greater than or equal to 5, or greater), and that does not experience dielectric breakdown under applied voltage potentials. In some embodiments, a dielectric elastomer may use one or more electrodes configured to compress the elastomer in order to be used as a dielectric elastomer.

As another example of an electroactive polymer that responds to the voltage potential as a result of electrostatic forces, the electroactive polymer may comprise a ferroelectric polymer, which experiences a linear coupling between strain and applied voltage potential, due to the inherent piezoelectricity of the ferroelectric polymer. Alternately or additionally, the electroactive polymer may comprise an electrostrictive polymer, which is dielectric rather than ferroelectric, but which nonetheless experiences a second-order coupling between applied voltage potential and strain of the electroactive polymer. A ferroelectric polymer or an electrostrictive polymer, in some embodiments, can be strained by an applied voltage potential due to localized structural effects, such as deformation of the polymer's crystal structure in response to the voltage potential. Therefore, unlike dielectric elastomers, ferroelectric polymers and/or electrostrictive polymers may not require mechanical coupling to electrodes or external compression, in order to experience strain under an applied voltage potential.

In other embodiments, the electroactive polymer responds to the voltage potential due to the motion of ions or their conjugated substances within the electroactive polymer. For example, the electroactive polymer can be an ionic electroactive polymer. This can result in the displacement of mass and/or an overall change in shape.

While specific types of electroactive polymers are provided above, an electroactive polymer may comprise any suitable polymeric material that changes shape when a voltage potential is applied to the polymeric material. For example, in some embodiments, the electroactive polymer comprises at least one of: a dielectric electroactive polymer, such as a dielectric elastomer (e.g., an elastomer comprising silicone and/or an acrylic elastomer, such as 3M VHB 4910 acrylic) or an electrostrictive polymer; a ferroelectric polymer, such as polyvinylidene fluoride (PVDF) its copolymers (e.g., poly(vinylidene trifluoroethylene), P(VDF-TrFE), or poly(vinylidene trifluoroethylene chlorotrifluoroethylene), P(VDF-TrFE-CTFE)); ionic polymer, such as an intrinsically conducting polymer (e.g., a polythiophene); and/or any other appropriate material. In some embodiments, the electroactive polymer is an elastomer. Blends and/or copolymerizations of an elastomer with an electroactive polymer may also be used. In some embodiments, composite structures may also be used, for instance, an elastic diaphragm may comprise a first layer, comprising an elastomer that is not an electroactive polymer, and a second layer, comprising an electroactive polymer.

In some embodiments, a voltage potential is applied to an electroactive polymer using one or more electrodes. The electrodes may be separate from the valve (e.g., the valve may rest inside of a capacitor). In some embodiments, the valve comprises the electrodes. For example, in certain embodiments, the valve comprises a first electrode, located on a first side of the electroactive polymer, and a second electrode, located on a second side of the electroactive polymer.

When present within the valve, an electrode may comprise any suitable material. According to certain embodiments, the electrode may comprise a conducting material. For example, the electrode may comprise a metal, such as gold, silver, copper, aluminum, or combinations thereof. In some embodiments, the electrode may comprise an intrinsically conducting polymer such as polythiophenes, polypyrroles, polyanilines, polyacetylenes, and copolymers thereof. According to certain embodiments, the valve comprises 0, 1, 2, 3, 4, or more electrodes. In some embodiments, one or more of the electrodes are connected to a power source.

Generally, the electrodes may be fabricated by any appropriate method. According to certain embodiments, the electrode may be directly deposited on the elastic diaphragm. For example, the electrode may be deposited by vapor deposition (e.g., chemical vapor deposition, physical vapor deposition). In some embodiments, the electrode may be fabricated separately and adhered to a surface of the electroactive polymer. In some embodiments, the electroactive polymer is deposited on a separately fabricated electrode (e.g., by solvent evaporation, melt processing). In some embodiments, the electrode is a standalone layer (e.g., a foil) that mechanically coupled to the elastic diaphragm. Of course, these methods are not limiting, and any appropriate method may be used to produce the electrode.

In some embodiments, an electrode may directly contact the electroactive polymer. However, in other embodiments the electrode and the electroactive polymer are separated by at least 1, at least 2, at least 3, at least 4, at least 5, or more intervening layers (e.g., non-electroactive elastomer layers, adhesive layers, sensing layers, etc). According to certain embodiments, the electrodes are electrically connected to a voltage source, as described in greater detail elsewhere herein. The electrical connection to the voltage source may comprise wires, printed circuit boards, or any other appropriate materials for forming electrical connections. The electrical connection may further comprise intervening electronics (e.g., resisters, diodes, switches) of any suitable variety. Of course, those of ordinary skill in the art may produce any number of suitable electrical connections between the electrode and the voltage source, and the disclosure is not thus limited.

In some embodiments, one or more magnets may be used to apply a magnetic field to a valve to apply a desired force to the magnetic material contained within the valve. It should be understood in the various embodiments disclosed herein that any suitable type of magnet may be used. For example, the one or more magnets used to apply, or vary a magnitude of, the magnetic field applied to a valve may include, but are not limited to, a permanent magnet, an electromagnet, combinations of the forgoing, and/or any other appropriate type of magnet. Additionally, a magnet may have any suitable form factor. For example, the magnet may be a bar magnet, a ring magnet, a horseshoe magnet, a disk magnet, a sphere magnet, a cylinder magnet, and/or any other appropriate form factor as the disclosure is not thus limited.

Regarding the above noted use of one or more electromagnets, a magnetic field strength of an electromagnet may be controlled by changing a magnitude of a current passing through the electromagnet. According to some embodiments, either starting, or increasing a magnitude, of the current passing through the electromagnet may increase the magnetic field strength of the electromagnet. According to some embodiments, decreasing, or stopping, the flow of current through the electromagnet may decrease the magnetic field strength of the electromagnet. Similarly, moving an electromagnet towards a valve may increase in applied magnetic field strength and moving an electromagnet away from a valve may decrease the applied magnetic field strength.

In view of the above, a magnet may be used to apply a desired magnetic field using any suitable method. For example, according to some embodiments, a magnet may be manually used to apply the magnetic field. For example, a physical magnet may be manually moved with respect to the valve in order to apply a magnetic field to the elastic diaphragm, according to some embodiments. Alternatively, an actuator may be configured to move a magnet (e.g., using an operative coupling between the actuator and an electromagnet or a physical magnet) towards and away from the valve in order to apply the magnetic field to the elastic diaphragm. In other embodiments, a current of an electromagnet may either be manually adjusted (e.g., by manually switching the electromagnet on) or an associated processor operatively coupled to a power source electrically connected to the electromagnet may command the power source to apply a current to the electromagnet in order to vary and/or apply a magnetic field to the elastic diaphragm.

While physical movement of a magnet is described above, the magnetic field applied to the elastic diaphragm can be altered, in some embodiments, by changing a current passing through an electromagnet instead. For example, in some embodiments the current passing through the magnet may be reduced (e.g., reduced to zero), such that the strength of the magnetic field experienced by the valve is reduced to below a threshold magnetic field for opening the valve (e.g., reduced to zero). In some embodiments, the current passing through the magnet may be increased, such that the strength of the magnetic field experienced by the valve is increased to above a threshold magnetic field to open the valve.

An average magnitude of magnetic flux density, |B|, experienced by an elastic diaphragm when transitioning between the open and closed configuration of a valve may fall within any suitable range. Generally, the average magnitude of magnetic flux density, |B| used to move the elastic diaphragm between the open configuration and the closed configuration will vary based on the size, shape, and type of elastic diaphragm included in a valve as well as the quantity and distribution of magnetic material within the elastic diaphragm.

In some embodiments, the average magnitude of magnetic flux density, |B|, applied to an elastic diaphragm to transition between the open and closed configurations of a valve may be greater than or equal to 0.1 T, greater than or equal to 0.2 T, greater than or equal to 0.3 T, greater than or equal to 0.4 T, greater than or equal to 0.5 T, greater than or equal to 0.75 T, greater than or equal to 1 T, greater than or equal to 1.5 T, or greater. In some embodiments the average magnitude of magnetic flux density, |B|, applied to the elastic diaphragm to transition between the configurations is less than or equal to 3 T, less than or equal to 2 T, less than or equal to 1.5 T, less than or equal to 1 T, less than or equal to 0.75 T, less than or equal to 0.5 T, or less. Combinations of these ranges are possible. For example, in some embodiments, the average magnitude of magnetic flux density, |B|, applied to the elastic diaphragm is greater than or equal to 0.1 T and less than or equal to 3 T. As a more specific example, according to some embodiments, the average magnitude of magnetic flux density, |B|, applied to the elastic diaphragm is greater than or equal to 0 T and less than or equal to 0.5 T. As another example, according to some embodiments, the average magnitude of magnetic flux density, |B|, applied to the elastic diaphragm is greater than or equal to 0.2 T and less than or equal to 0.5 T. Of course, average magnitudes of magnetic flux densities for transitioning between the open and closed configurations of a valve both greater than and less than those noted above are also contemplated as the disclosure is not so limited.

In some embodiments, one or more sources of voltage may be used to apply a voltage potential to a valve to deform an electroactive polymer contained within the valve. It should be understood in the various embodiments disclosed herein that any suitable source of voltage may be used. For example, the voltage potential may be applied, in some embodiments, by using electrodes connected to a power supply to apply or vary an average voltage potential applied to a valve. Suitable power supplies may include, but are not limited to: a battery or a DC power supply other than a battery; an AC power supply with an appropriate DC converter, and/or any other appropriate type of power supply arrangement according to some embodiments. Combinations of the forgoing, and/or any other appropriate type of power supply may be used.

The electrodes may have any suitable form factor. For example, the electrodes may be square, rectangular, circular, annular, and/or any other appropriate form factor as the disclosure is not thus limited. In some embodiments, the voltage source is a statically charged surface without a connection to a power supply. The statically charged surface may be charged in any suitable fashion. For example, the statically charged surface may be prepared by hand, or by using a triboelectric generator, such as a Van de Graaff generator. The voltage potential experienced by the valve can then be manipulated by varying a spatial position of the charged surface with respect to the valve. The actuation of the valve using the statically charged surface may be considered, in some embodiments, to be controlled in a similar manner to actuation of a valve comprising a magnetic material using a bar magnet.

In view of the above, a voltage source may be used to apply a desired voltage potential using any suitable method. For example, in some embodiments a power supply may be used (e.g., turned on, turned off, or adjusted) to apply a desired voltage potential. In some embodiments, the power supply is operatively connected to a processor, e.g., that can be used to control the voltage potential applied to the valve using the power supply. Alternatively, a charged surface may either be moved manually and/or by an associated actuator to move a statically charged surface or an electrode of a capacitor external to the valve (e.g., using an operative coupling between the actuator and the statically charged surface or electrode) towards and/or away from the valve in order to apply the voltage potential to the elastic diaphragm.

An average voltage potential, V, experienced by an elastic diaphragm when transitioning between the open and closed configuration of a valve may fall within any suitable range. Generally, average voltage potential, V, used to move the elastic diaphragm between the open configuration and the closed configuration will vary based on the size, shape, and type of elastic diaphragm included in a valve as well as the quantity and distribution of the electroactive polymer within the elastic diaphragm.

In some embodiments, a threshold voltage potential, V, applied to an elastic diaphragm to transition between the open and closed configurations of a valve may be greater than or equal to 1 V, greater than or equal to 2 V, greater than or equal to 5 V, greater than or equal to 10 V, greater than or equal to 20 V, greater than or equal to 50 V, greater than or equal to 100 V, greater than or equal to 200 V, greater than or equal to 500 V, greater than or equal to 1000 V, or greater. In some embodiments the threshold voltage potential, V, applied to the elastic diaphragm to transition between the configurations is less than or equal to 2000 V, less than or equal to 1000 V, less than or equal to 500 V, less than or equal to 200 V, less than or equal to 100 V, less than or equal to 50 V, less than or equal to 20 V, less than or equal to 10 V, less than or equal to 5 V, or less. Combinations of these ranges are possible. For example, in some embodiments, the threshold voltage potential, V, applied to the elastic diaphragm is greater than or equal to 1 V and less than or equal to 2000 V. Of course average voltage potential, V, for transitioning between the open and closed configurations of a valve both greater than and less than those noted above are also contemplated as the disclosure is not so limited.

The valves, systems, and methods described herein are useful for a broad range of applications where control of fluid flow is desirable. For example, in some embodiments, the valves may be used to precisely control a rate of fluid transfer. Thus, in some embodiments, valves as described herein are used for liquid handling systems. The valves may also be used for dosing, according to some embodiments. In some embodiments, the valve (e.g., through-holes of the valve) is in fluid communication with a vessel (e.g., a vessel of a liquid handling system). The vessel may be used for any application that is physically compatible with the valve. For example, the vessel may be a chamber of a syringe, according to certain embodiments. The valve may also be used in systems (e.g., liquid handling systems) that can be used to make media (e.g., culture media), according to certain embodiments. For example, the vessel of the system (e.g., the liquid handling system) is a bioreactor, according to some embodiments. In some embodiments, the valves of the liquid handling system may be used to precisely and/or accurately fill the bioreactor. For the sake of clarity, most of the figures and embodiments described herein are directed to valves including magnetic materials. However, the various configurations of valves disclosed herein may be used with either magnetic materials dispersed in an elastic material and/or electroactive polymers as the disclosure is not so limited. Accordingly, any of the various valve constructions disclosed herein may be modified to be actuated using either one, or both, of a voltage source operatively connected to a valve made from an electroactive polymer and/or a magnet that may be used to apply a magnetic field to the valve.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
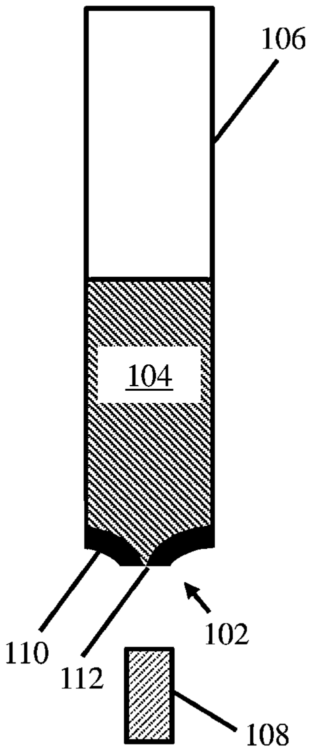
FIG. 1B depicts the valve of FIG. 1A with the elastic diaphragm in a second, open configuration with the magnet positioned proximate to the valve.

FIGS. 1A-1B show cross-sectional schematic illustrations of valve 102 and magnet 108, according to certain embodiments. In FIGS. 1A-1B, tubing 106, or other appropriate vessel, that contains fluid 104, and is connected to valve 102 that extends across and seals an outlet or other flow path extending out from the sealed volume of fluid. In FIGS. 1A-1B, magnet 108 is depicted as a permanent bar magnet.

Referring again to FIGS. 1A-1B, although valve 102 is shown at the end of tubing 106, the valve and can also be placed in the middle of the tubing or along any desired flow path to control the flow of a liquid contained within the interior volume of a vessel. Thus, in some embodiments, valve 102 may be fluidically connected to an outlet, inlet, or other flow path associated with the vessel. In the depicted embodiment, the valve 102 is positioned at and seals an outlet from an interior volume of the relative to an exterior of the vessel. For example, valve 102 may be an outlet of a syringe. However, in other embodiments, the valve may be disposed between the vessel and another component of a fluidic system.

Components of the valve may be selected for any suitable purpose. According to some embodiments, the components of the valve may be chosen, at least in part, for compatibility with the intended use of the liquid handling system. For example, if the liquid handling system comprises a bioreactor, components such as the elastic diaphragm of the valve may be chosen to be cytocompatibile, and to be resistant to degradation in culture media. According to some embodiments, the components of the valve may be chosen, at least in part, for their low replacement cost. For example, the valves described herein may be employed as single-use valves (e.g., as valves of single-use syringes), according to some embodiments. In some such embodiments, the bioreactor may be a single-use bioreactor.

As noted above, in some embodiments, a magnet 108 may be operated and/or moved relative to an elastic diaphragm 110 of a valve to apply a magnetic field to the elastic diaphragm of the valve, such that the elastic diaphragm moves between an open configuration, where fluid flow is permitted, and a closed configuration, where fluid flow is blocked by the valve. According to some embodiments, in a first configuration of the magnet relative to the valve, the elastic diaphragm is in a closed configuration, as shown in FIG. 1A, with the magnet spaced from the closed diaphragm. Accordingly, when the magnet is moved to a second configuration relative to the diaphragm, e.g. moved closer to the diaphragm or otherwise altered to apply a larger magnetic field, the elastic diaphragm may transition to from the closed configuration to the open configuration as shown in FIG. 1B. This process is elaborated on further below.

Changing the configuration of the magnet 108 may alter the magnetic field applied to the elastic diaphragm 110 of the valve 102. The magnetic field applied to the elastic diaphragm can be altered, in some embodiments, by moving the magnet relative to the valve. For example, in some embodiments the magnet may be moved further away from the valve, such that the strength of the magnetic field experienced by the valve is reduced. In some embodiments, the magnet may be moved closer to the valve, such that the strength of the magnetic field experienced by the valve is increased. For example, the magnet may be a free standing magnet, a sliding magnet coupled to the system with a slip fit, or other arrangement that permits the magnet to be moved relative to the valve. In either case, the magnet may be operatively coupled to the valve such that the magnet is configured to be selectively moved towards and away from the elastic diaphragm. For example, in FIG. 1A, valve 102 is in the closed configuration because magnet 108 is positioned further away from the valve. In FIG. 1B, valve 102 is in the open configuration because the magnet 108 is positioned closer to the valve and applies a larger magnetic field to the diaphragm of the valve. Alternatively, in some embodiments, an orientation of the magnet with respect to the valve may be changed.

In FIGS. 1A-1B, valve 102 is a slit valve comprising elastic diaphragm 110 and one or more slits 112 formed in the diaphragm. In FIG. 1A, valve 102 is in its closed configuration, such that opposite sides of the depicted slit 112 are either in direct contact with one another, or are sufficiently close together to prevent flow of liquid 104 through the slit. In FIG. 1B, valve 102 is in its open configuration, since magnet 108 exposes elastic diaphragm 110 deforming the diaphragm towards the magnet when a sufficiently large magnetic field is applied to open the slit 112. This may cause a width of the slit corresponding to a distance between the opposing sides of the slit to increase to a width sufficiently large to permit the flow of liquid 104 through the slit. Although only one slit is shown, the slit valve may comprise multiple slits, as described in FIGS. 5A-5B, herein.

Figure 2A:
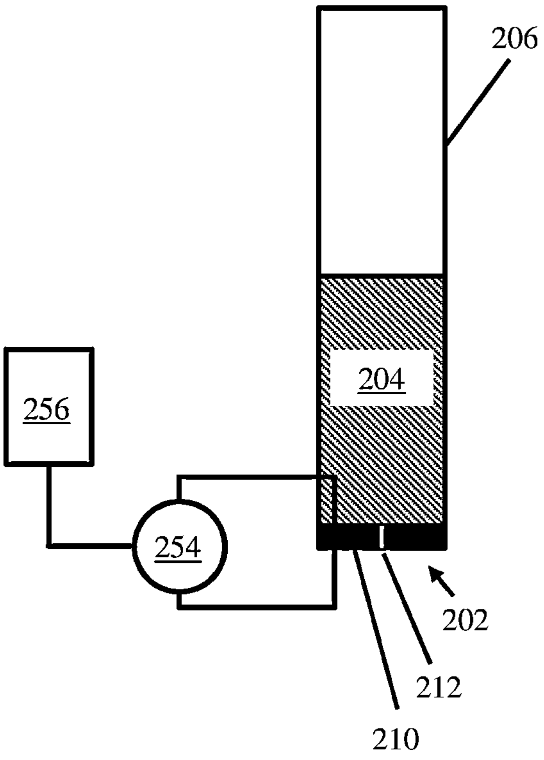
FIG. 2A depicts one embodiment of a valve including an elastic diaphragm and a power source in a first closed configuration.
Figure 2B:
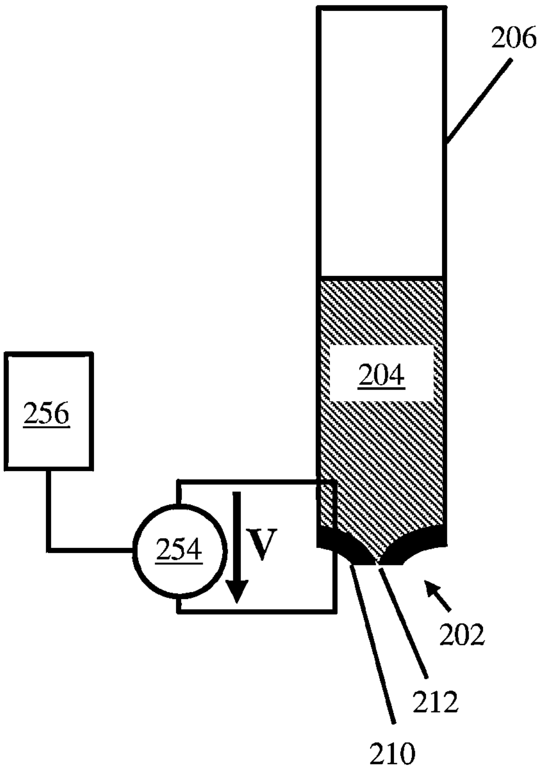
FIG. 2B depicts the valve of FIG. 2A with the elastic diaphragm in a second open configuration.

FIGS. 2A-2B show cross-sectional schematic illustrations of valve 202, connected to power source 154, according to certain embodiments. Valve 202 is similar in construction and function to valve 102 of FIGS. 1A-1B. However, valve 202 does not comprise a magnetic material, and instead comprises an electroactive polymer. In FIGS. 2A-2B, tubing 206, or other appropriate vessel, that contains fluid 204, and is connected to valve 202 that extends across and seals an outlet or other flow path extending out from the sealed volume of fluid.

As noted above, in some embodiments, the power source 254 may be operated using processor 256, such that power source 256 applies a voltage potential V to an elastic diaphragm 210 of valve 202, such that the elastic diaphragm moves between an open configuration, where fluid flow is permitted, and a closed configuration, where fluid flow is blocked by the valve. In some embodiments, in a first configuration of the power source, the elastic diaphragm is in a closed configuration as shown in FIG. 2A, with the power supply 254 turned off or is used to apply a first voltage potential to the electroactive polymer of the elastic diaphragm. Accordingly, when the power supply 254 is turned on, or altered, a second voltage potential may be applied to the electroactive polymer of the elastic diaphragm the elastic diaphragm causing the diaphragm to transition from the closed configuration to the open configuration as shown in FIG. 2B. This process is elaborated on further below.

In FIGS. 2A-2B, valve 202 is a slit valve analogous to valve 202 of FIGS. 2A-2B. In FIG. 2A, valve 202 is in its closed configuration, such that opposite sides of the depicted slit 212 are either in direct contact with one another, or are sufficiently close together to prevent flow of liquid 204 through the slit. Although only one slit is shown, the slit valve may comprise multiple slits, as described in FIGS. 5A-5B, herein.

Figure 2C:
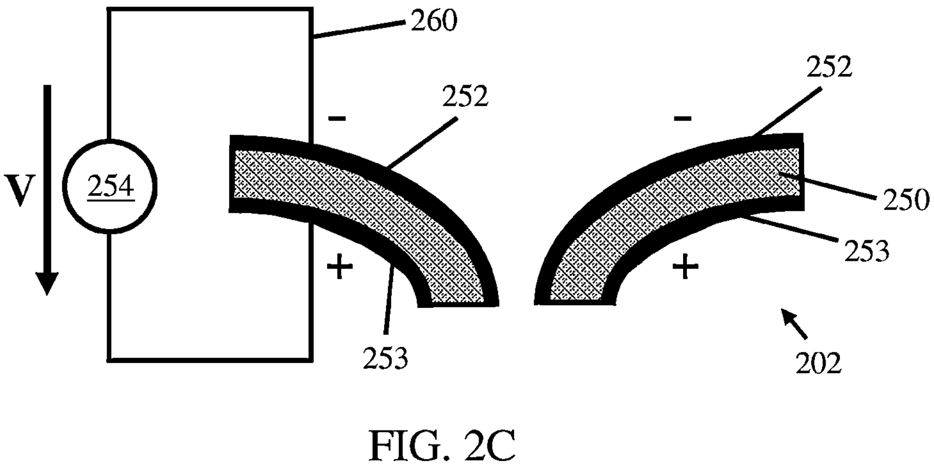
FIG. 2C is an enlarged version of the valve of FIGS. 2A and 2B in the open configuration.

FIG. 2C presents a close-up image of the valve and the power source of FIGS. 2A-2B, where the valve is in the open configuration. In some embodiments, such as the embodiment of FIG. 2C, the elastic diaphragm comprises an electroactive polymer 250, with a first electrode 252 deposited on a first side of the electroactive polymer 250. It should be noted that while the cross-section of the valve appears discontinuous, in FIG. 2C, this is only because FIG. 2C presents a cross-section of valve 202, which comprises a unitary elastic diaphragm. Thus, an electrical connection 260 shown to a first side of the slit is also a connection to the second side of the slit, in some embodiments such as that of FIG. 2C. In some embodiments, the power source 254 acts as a source of a voltage potential V, as indicated. This may result in the charging of electrodes 252 and 253, indicated by the plus-symbol (indicating an electrode with positive charge) and the minus-symbol (indicating an electrode with negative charge). Thus, the applied voltage potential may be selectively altered to control a transition of the valve between the depicted opening closed configurations by controlling a magnitude of the voltage potential applied to the electroactive polymer of the elastic diaphragm.

Figure 3A:
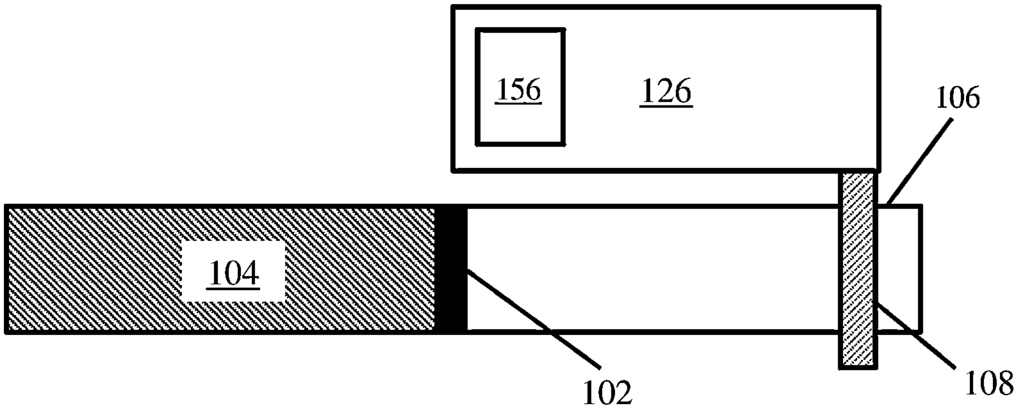
FIG. 3A depicts one embodiment of a system comprising an actuator and a valve including an elastic diaphragm in a first, closed configuration, with a magnet spaced from the valve, according to certain embodiments.
Figure 3B:
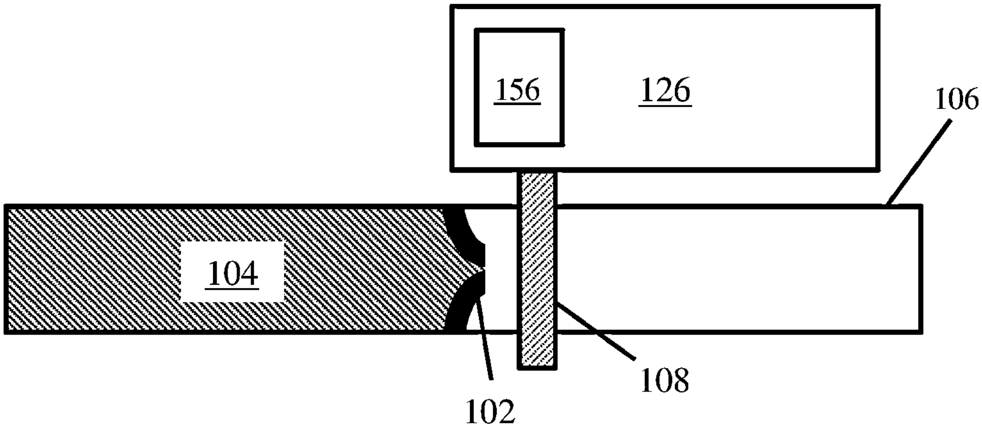
FIG. 3B depicts the system of FIG. 3A with the elastic diaphragm in a second, open configuration, with a magnet proximate to the valve, according to certain embodiments.

FIGS. 3A-3B, like FIGS. 1A-1B, show cross-sectional schematic illustrations of valve 102 and magnet 108, according to certain embodiments. In FIGS. 3A-3B, tubing 106, or other appropriate vessel, contains fluid 104, such as a liquid, and valve 102 that selectively seals a flow path extending from the vessel. In FIGS. 3A-3B, magnet 108 is depicted as a permanent ring magnet extending around the vessel though other types of magnets may be used. In either case, the magnet may be operatively coupled to an actuator 126 that is configured to alter a position of the magnet relative to the valve such that the magnet may be moved towards and away from the diaphragm of the valve. As in FIGS. 1A-1B, in FIGS. 3A-3B, valve 102 is a slit valve. In FIG. 3A, valve 102 is in the closed configuration because the actuator has positioned the magnet 108 at a location distanced away from the valve. In FIG. 3B, valve 102 is in the open configuration because of the actuator has positioned the magnet 108 at a second closer location relative to the valve.

While a physical actuator, such as a motor and appropriate transmission, have been depicted as being used to change a position of the magnet relative to the valve, the disclosure is not limited to only using actuators or manual manipulation of a magnet to operate the valves disclosed herein. For example, a power source may be used to change the current applied to an electromagnet as previously described in some embodiments.

Figure 4A:
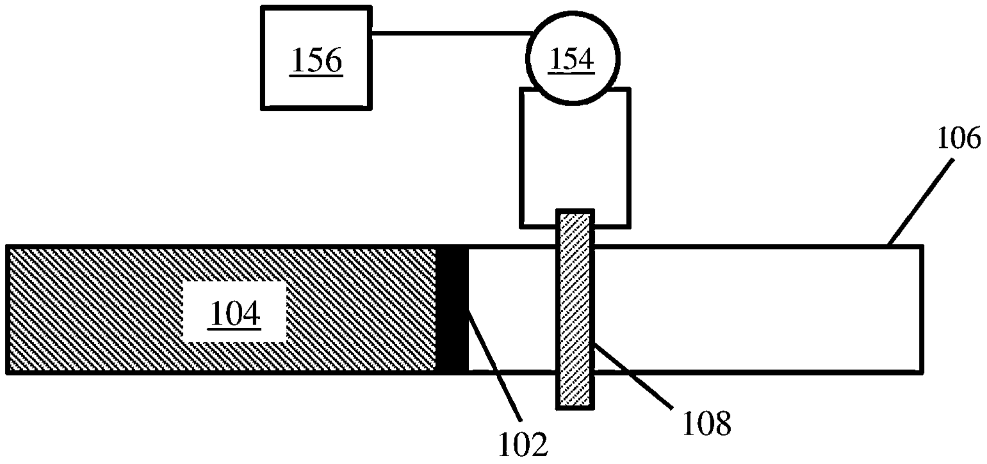
FIG. 4A depicts one embodiment of a system comprising an electromagnet and a valve including an elastic diaphragm in a first closed configuration according to certain embodiments.
Figure 4B:
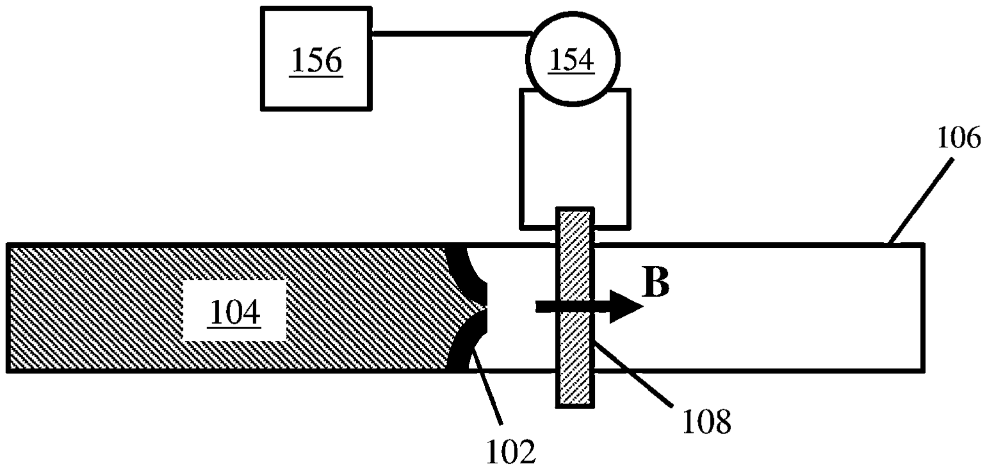
FIG. 4B depicts the system of FIG. 4A with the elastic diaphragm in a second open configuration according to certain embodiments.

As an example, FIGS. 4A-4B, like FIGS. 3A-3B, show cross-sectional schematic illustrations of valve 102 and magnet 108, according to certain embodiments. In FIGS. 4A-4B, tubing 106, or other appropriate vessel, contains fluid 104, such as a liquid, and valve 102 that selectively seals a flow path extending from the vessel. In FIGS. 4A-4B, magnet 108 is depicted as an electromagnet extending around the vessel though other types of electromagnets may be used. In either case, the magnet may be operatively coupled to a power source 154 that is configured to control a current supplied to magnet 108, optionally in response to processor 156. In some embodiments such as that of FIGS. 4A-4B, magnet 108 remains stationary relative to the valve. As in FIGS. 3A-3B, in FIGS. 4A-4B, valve 102 is a slit valve. In FIG. 4A, valve 102 is in the closed configuration because the current supplied to magnet 108 by power supply 154 is less than a threshold current and the applied magnetic field is less than a threshold magnetic field. In FIG. 4B, valve 102 is in the open configuration because the current supplied to magnet 108 by power supply 154 is greater than the threshold current, resulting in the generation of a magnetic field B greater than the threshold magnetic field causing the elastic diaphragm to deform into the open configuration.

Figure 5A:
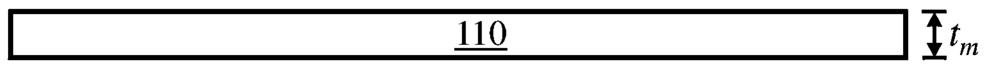
FIG. 5A depicts a side-view of one embodiment of an elastic diaphragm of a slit valve, according to certain embodiments.
Figure 5B:
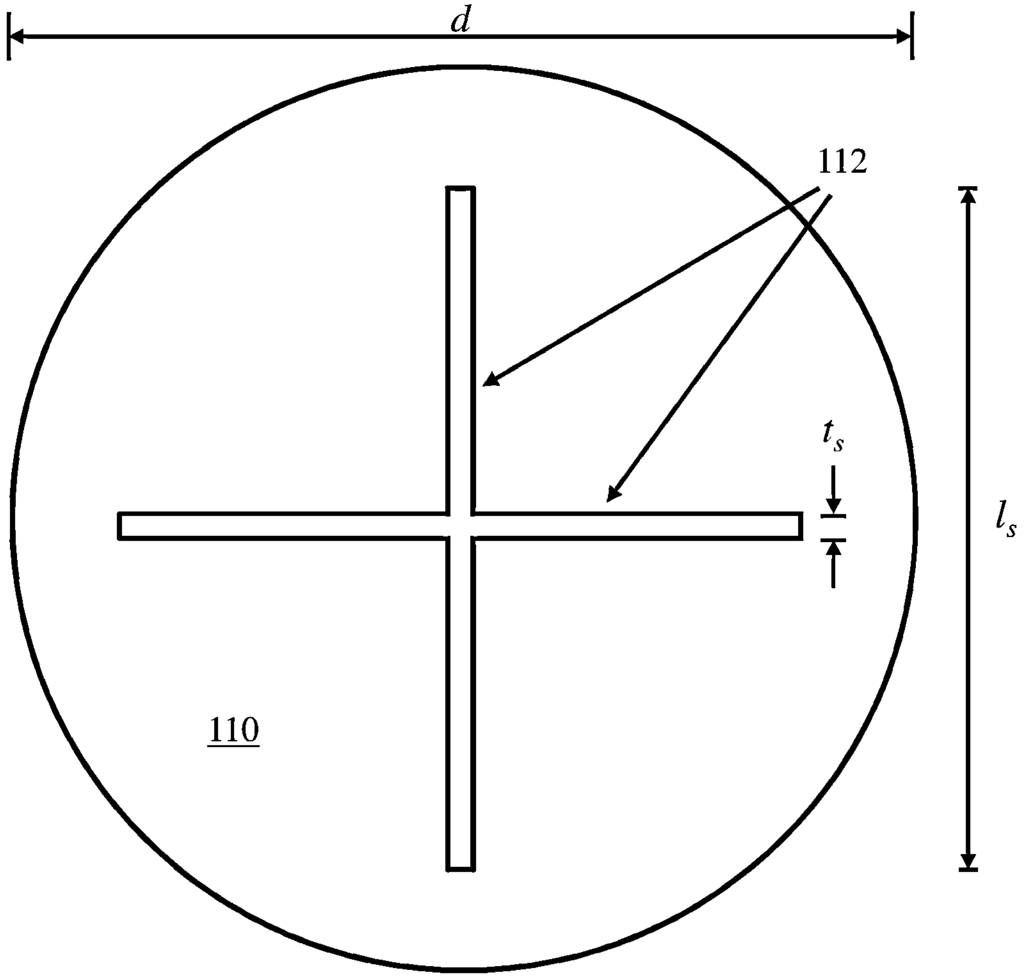
FIG. 5B depicts a top-view of the slit valve of FIG. 5A, according to certain embodiments.

FIGS. 5A-5B show schematic illustrations of elastic diaphragm 110 of a slit valve, according to certain embodiments. FIG. 5A is a side-view illustration of elastic diaphragm 110, illustrating the thickness, $t_m$, of the elastic diaphragm, according to some embodiments. FIG. 5B. is a top-view illustration, illustrating slits 112 of elastic diaphragm 110, and illustrating the width of the slits, $t_s$, the length of the slits, $l_s$, and the diameter of the elastic diaphragm, d, according to some embodiments.

Referring to FIGS. 5A-5B, in some embodiments, an elastic diaphragm has a thickness, $t_m$. In some embodiments, the thickness, $t_m$, is greater than or equal to 0.1 millimeters, greater than or equal to 0.15 millimeters, greater than or equal to 0.2 millimeters, greater than or equal to 0.25 millimeters, greater than or equal to 0.3 millimeters, greater than or equal to 0.5 millimeters, or greater. In some embodiments, the thickness, $t_m$, is less than or equal to 2 millimeters, less than or equal to 1.5 millimeters, less than or equal to 1.2 millimeters, less than or equal to 1 millimeter, less than or equal to 0.75 millimeters, less than or equal to 0.5 millimeters, or less. Combinations of these ranges are possible. For example, in some embodiments, the thickness, $t_m$, is greater than or equal to 0.1 millimeters and less than or equal to 2 millimeters. As a more specific example, in some embodiments, the thickness, $t_m$, is greater than or equal to 0.25 millimeters and less than or equal to 0.75 millimeters. However, elastic diaphragms with thicknesses both greater and less than those noted above may also be used as the disclosure is not so limited. Additionally, it should be understood that the elastic diaphragms disclosed herein may either exhibit uniform thicknesses and/or variations in thickness as the disclosure is not limited to any particular construction.

In some embodiments, an elastic diaphragm may also have a maximum transverse dimension, d, such as a diameter, a diagonal of a rectangle, or any other appropriate type of maximum transverse dimension. Generally, the elastic diaphragm may have any suitable maximum transverse dimension appropriate for a desired application. Referring again to FIGS. 5A-5B, in some embodiments, the maximum transverse dimension, d, is greater than or equal to 2 millimeters, greater than or equal to 5 millimeters, greater than or equal to 7 millimeters, greater than or equal to 10 millimeters, or greater. In some embodiments, the maximum transverse dimension, d, less than or equal to 100 millimeters, less than or equal to 75 millimeters, less than or equal to 50 millimeters, less than or equal to 25 millimeters, less than or equal to 20 millimeters, or less. Combinations of these ranges are possible. For example, in some embodiments, the maximum transverse dimension, d, is greater than or equal to 2 millimeters and less than or equal to 100 millimeters. As a more specific example, in some embodiments, the maximum transverse dimension, d, is greater than or equal to 10 millimeters and less than or equal to 20 millimeters. However, elastic diaphragms with transverse dimension both greater than and less than those noted above may also be used as the disclosure is not so limited.

As also shown in FIGS. 5A-5B, in some embodiments, an elastic diaphragm may include one or more slits which may extend along a surface of the elastic diaphragm with a slit length, $l_s$. In some embodiments, the slit length, $l_s$, is greater than or equal to 5%, is greater than or equal to 10%, greater than or equal to 20%, greater than or equal to 30%, greater than or equal to 40%, greater than or equal to 50%, greater than or equal to 60%, or more of a maximum transverse dimension (e.g. a diameter) d of the elastic diaphragm. In some embodiments, the slit length, $l_s$, is less than or equal to 90%, less than or equal to 80%, less than or equal to 75%, less than or equal to 70%, less than or equal to 60%, or less of the maximum transverse dimension, d. Combinations of these ranges are possible. For example, in some embodiments, the slit length, $l_s$, is greater than or equal to 5% and less than or equal to 90% of the maximum transverse dimension, d. As a specific example, according to some embodiments, the slit length, $l_s$, is greater than or equal to 50% and less than or equal to 75% of the maximum transverse dimension, d, e.g., when the valve is a slit valve. However, as noted above, embodiments in which a valve does not include slits are also contemplated, as noted in regards to the disclosed umbrella valves.

FIGS. 5A-5B, also show the slit width, $t_s$, of the closed elastic diaphragm in some embodiments. In some embodiments, $t_s$ is greater than or equal to 0 mm, greater than or equal to 0.1 mm, greater than or equal to 0.2 mm, greater than or equal to 0.25 mm, greater than or equal to 0.3 mm, greater than or equal to 0.5 mm, greater than or equal to 0.7 mm, or greater. In some embodiments, $t_s$ is less than or equal to 2 mm, less than or equal to 1 mm, less than or equal to 0.9 mm, less than or equal to 0.75 mm, less than or equal to 0.7 mm, less than or equal to 0.5 mm, or less. Combinations of these ranges are possible. For example, in some embodiments, $t_s$ is greater than or equal to 0 mm and less than or equal to 2 mm. However, elastic diaphragms with slit widths both greater than and less than those noted above may also be used as the disclosure is not so limited.

Figure 6A:
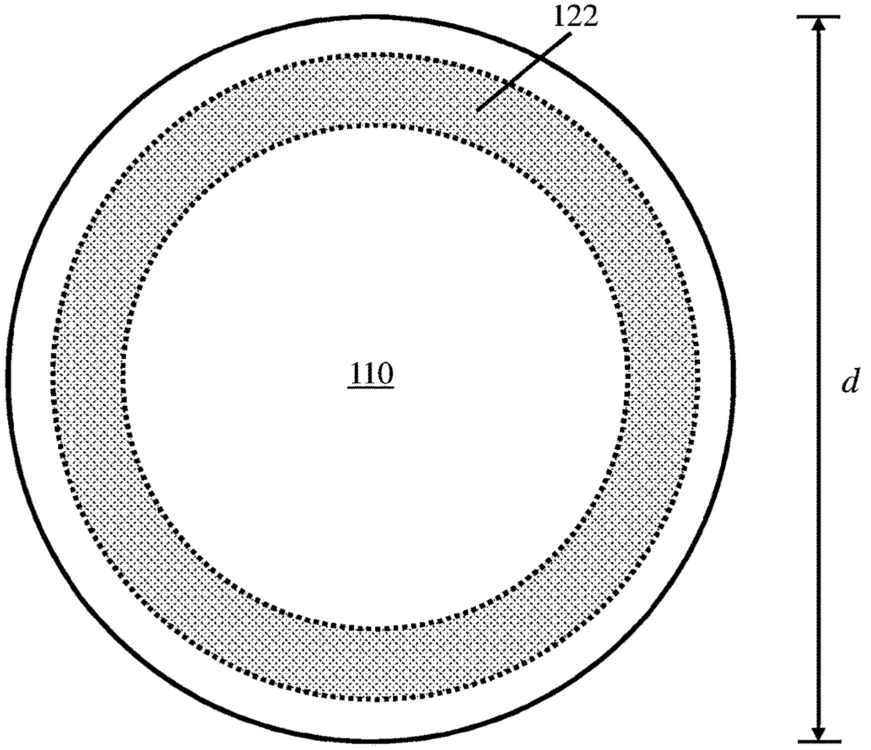
FIG. 6A depicts a top view of one embodiment of an umbrella valve, according to certain embodiments.
Figure 6B:
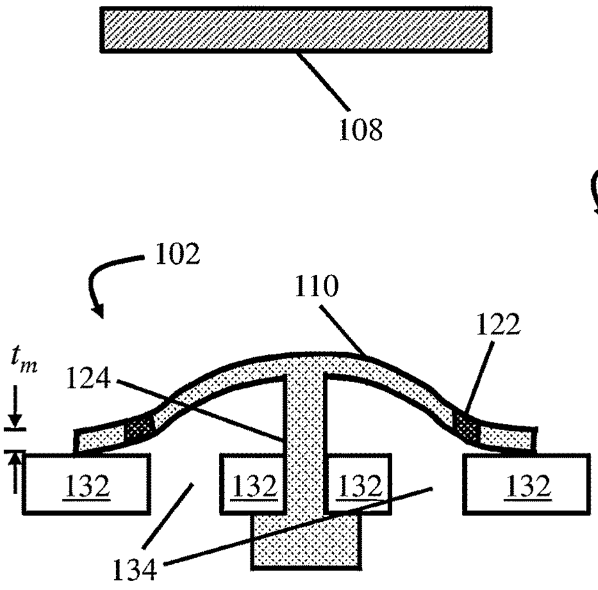
FIG. 6B depicts the valve of FIG. 6A in a first, closed configuration with a magnet spaced from the valve, according to certain embodiments.
Figure 6C:
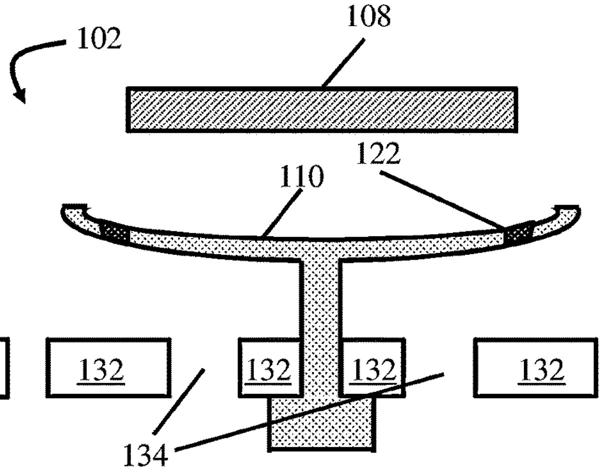
FIG. 6C depicts the valve of FIG. 6A in a second, open configuration with a magnet proximate to the valve, according to certain embodiments.

FIGS. 6A-6C show schematic illustrations of valve 102, which is an umbrella valve, according to certain embodiments. FIG. 6A presents a top-view schematic illustration of elastic diaphragm 110 in the closed configuration, according to certain embodiments. FIGS. 6B-6C show cross-sectional schematic illustrations of valve 102, according to certain embodiments. In this exemplary embodiment, elastic diaphragm 110 is a thin, flexible cap extending radially outwards from stem 124 connecting elastic diaphragm 110 to body 132. As with the slit valve, illustrated in FIG. 5A, elastic diaphragm 110 has a maximum transverse direction (e.g., a diameter) d, as shown in FIG. 6A, and a thickness $t_m$, shown in FIG. 6B, both of which fall within the ranges described herein.

According to certain embodiments, the elastic diaphragm extends over one or more through-holes formed in a portion of a body. Referring again to FIGS. 6B-6C, elastic diaphragm 110 extends over through-holes 134 of body 132. The body may be any suitable solid material. For example, the body may be a portion of a vessel, such as a bioreactor, according to certain embodiments. In some embodiments, the body may be a separator of a tube or pipe. The elastic diaphragm may be connected to the body by a stem, as described above. Referring again to FIGS. 6B-6C, elastic diaphragm 110 is connected to body 132 via stem 124, which extends through body 132 to anchor elastic diaphragm 110 to body 132.

The through-holes of the body may be of any appropriate geometry, provided that the elastic diaphragm extends over them. For example, the through-holes may be rectangular, may be circular, or may be annular portions, according to certain embodiments. According to certain embodiments, the through-holes have a maximum transverse dimension of greater than or equal to 0.05 d, greater than or equal to 0.1 d, greater than or equal to 0.25 d, or greater, relative to maximum transverse dimension d of the elastic diaphragm. According to certain embodiments, the through-holes have a maximum transverse dimension of less than or equal to 0.95 d, less than or equal to 0.75 d, less than or equal to 0.5 d, less than or equal to 0.25 d, less than or equal to 0.1 d, or less, relative to maximum transverse dimension d of the elastic diaphragm. Combinations of these ranges are possible. For example, the through-holes may have a maximum transverse dimension of greater than or equal to 0.05 d and less than or equal to 0.95 d, according to certain embodiments.

In FIG. 6B, valve 102 is in the closed configuration because magnet 108 is positioned away from it. In the closed configuration, the elastic diaphragm is deformed towards the body, such that the elastic diaphragm seals the one or more through-holes, in some embodiments. For example, in FIG. 6B, elastic diaphragm 110 seals through-holes 134 in body 132. In FIG. 6B, valve 102 is in the open configuration because of the new position of magnet 108, closer to the valve. In the open configuration, the elastic diaphragm is spaced from the one or more through-holes, such that fluid could flow through the through-holes, in some embodiments. This is shown in FIG. 1C, where elastic diaphragm 110 is spaced from through-holes 134.

The magnetic material is distributed uniformly throughout ring 122 of elastic diaphragm 110, according to certain embodiments. Ring 122 does not contact the edge of elastic diaphragm 110 in some embodiments as shown in FIGS. 6A-6C. However, in some embodiments, ring 122 does contact the edge of elastic diaphragm 110.

Although the embodiments of FIGS. 6A-6C present an umbrella valve comprising a magnetic material, in some embodiments the umbrella valve may alternatively or additionally comprise an electroactive polymer and/or electrodes that may be controlled using an applied voltage potential similar to the embodiment described in relation to FIGS. 2A-2C.

The following examples are intended to illustrate certain embodiments of the present invention, but do not exemplify the full scope of the invention.

EXAMPLE 1

Figure 7A:
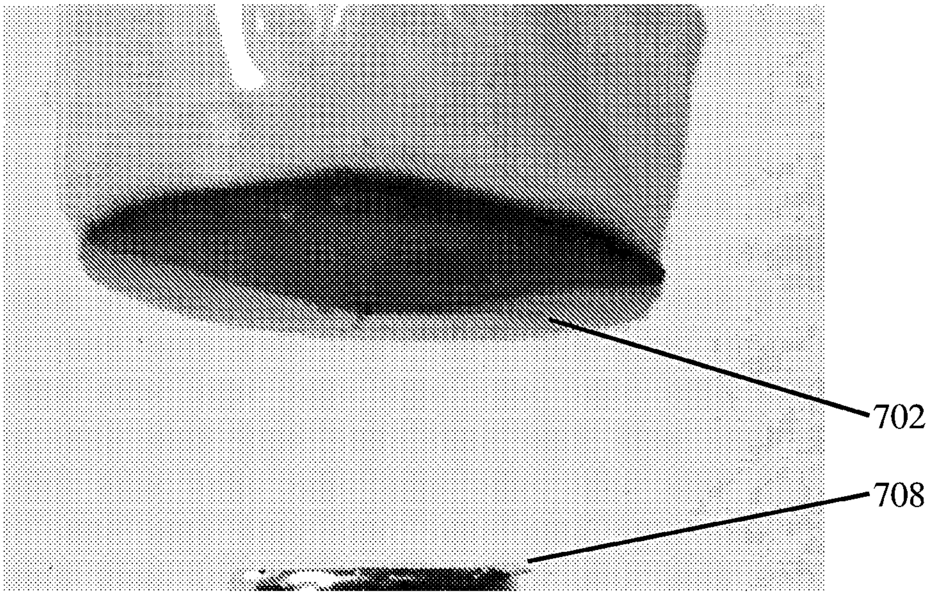
FIG. 7A presents an exemplary photograph of a slit valve at the end of a tube in a closed configuration, according to certain embodiments.
Figure 7B:
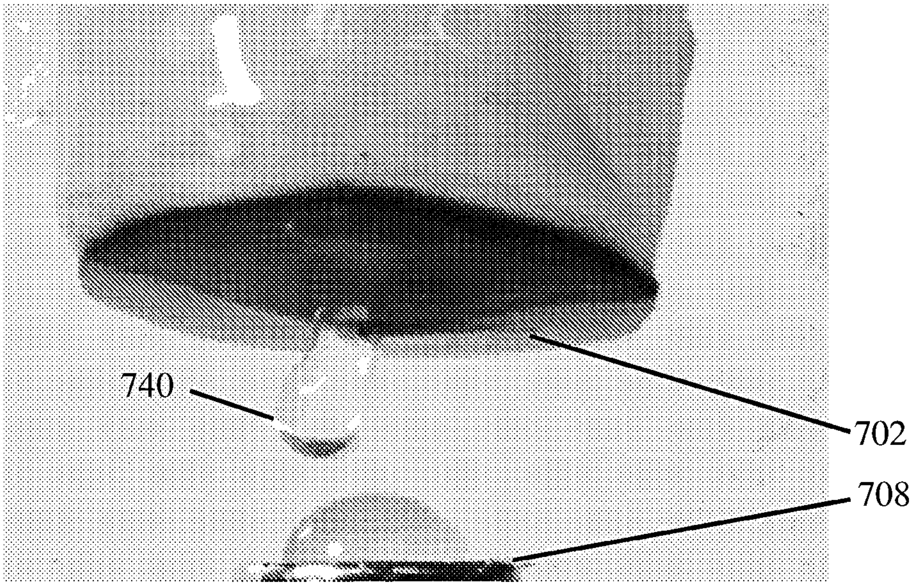
FIG. 7B presents an exemplary photograph of a slit valve at the end of a tube in an open configuration, according to certain embodiments.

This example describes the flow of fluid through an exemplary slit valve. In this example, a resin of a PVS elastomer was mixed with nanoparticles of magnetic material $Fe_3O_4$ to produce an elastomeric diaphragm wherein the magnetic material comprised 20% of the elastomeric diaphragm by weight. Two slits were cut in the exemplary elastic diaphragm, and it was connected to the end of a tube. Water was poured into the tube, which was oriented so that gravity pulled the water toward the valve. Then, the tube was brought into the proximity of a physical magnet. Initially, when the valve was positioned far from the magnet, no fluid flowed. This is illustrated in FIG. 7A, where valve 702 is positioned far from magnet 708. However, when the valve was moved closer to the magnet, water flowed from the valve onto the magnet. This is illustrated in FIG. 7B, where valve 702 is positioned close to magnet 708, resulting in the flow of fluid 740 onto magnet 708. This experiment demonstrates the viability of a slit valve for control of fluid flow as a part of a single-use system.

EXAMPLE 2

Figure 8A:
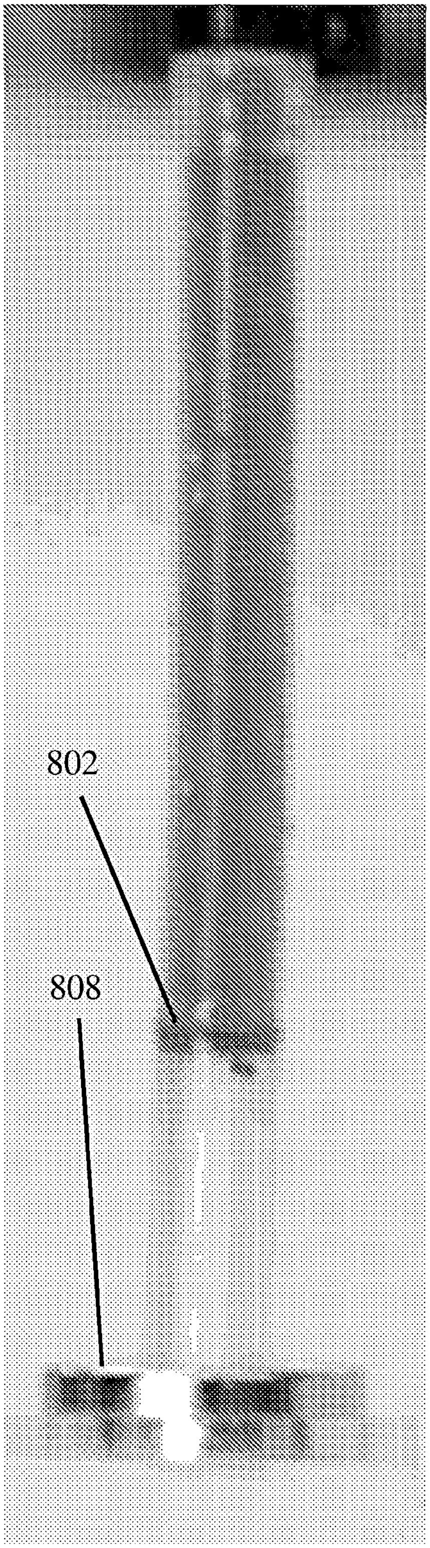
FIG. 8A presents an exemplary photograph of a slit valve in the middle of a tube in a closed configuration, according to certain embodiments.
Figure 8B:
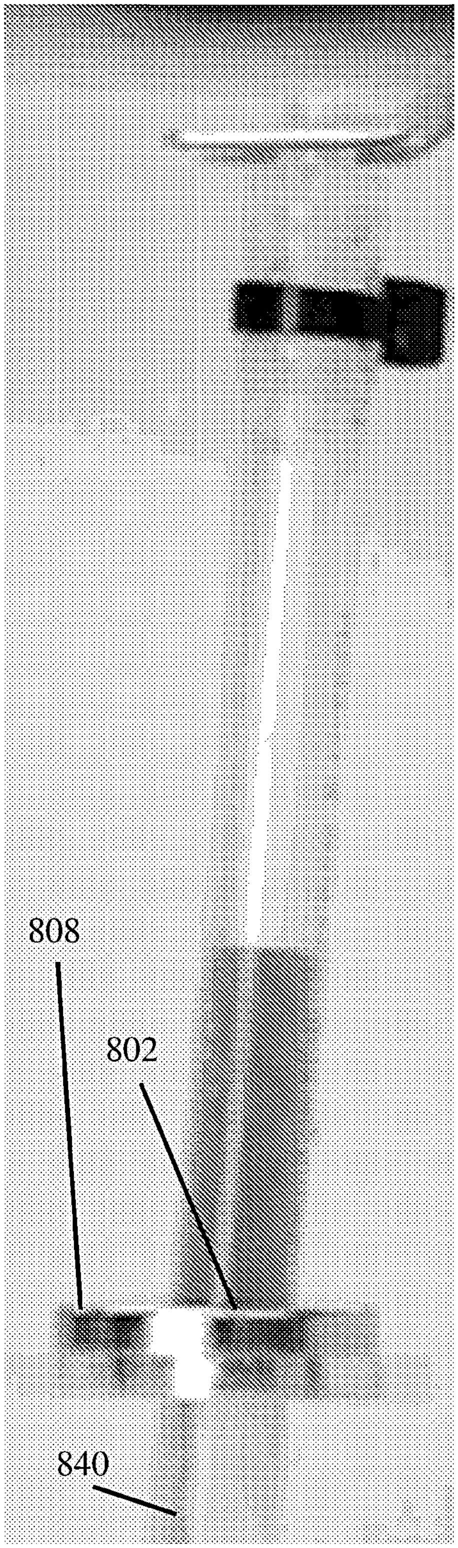
FIG. 8B presents an exemplary photograph of a slit valve in the middle of a tube in an open configuration, according to certain embodiments.

This example describes the opening of a slit valve using a ring magnet. In this example, an exemplary slit valve was prepared as in Example 1. The valve was installed in the center of a tube, and a dyed, aqueous solution was poured into the tube, which was oriented so that gravity pulled the solution toward the valve. Then, the tube was placed within a ring magnet, and lowered through the magnet until the valve opened. Initially, when the valve was positioned far from the magnet, no fluid flowed. This is illustrated in FIG. 8A, where valve 802 is positioned far from magnet 808. However, when the valve was moved closer to the magnet, the solution flowed from the valve and along the remainder of the tube. This is illustrated in FIG. 8B, where valve 802 is positioned close to magnet 808, resulting in the flow of fluid 840 along the remainder of the tube. This experiment demonstrates the viability of a slit valve for control of fluid flow as a part of a single-use system.

EXAMPLE 3

This example describes the control of an exemplary elastic diaphragm for an umbrella valve using a bar magnet. In this example, an exemplary elastic diaphragm was prepared by casting a resin of a PVS elastomer on a spherical steel ball to produce a spherical shell, cutting a first cap away from the spherical shell, casting a resin of a PVS elastomer was mixed with nanoparticles of magnetic material $Fe_3O_4$ on the shell, and cutting a second cap, the same size as the first cap, away from the spherical shell. Next, the first cap was placed on the spherical shell in place of the removed second cap. Finally, a second layer of PVS resin was poured on the spherical shell, to produce a double-layered spherical shell. A cap of the double-layered shell, with a larger diameter than the first cap or the second cap, was cut away to produce an exemplary elastic diaphragm comprising a ring of a $Fe_3O_4$-PVS elastomer composite.

Figure 9A:
FIG. 9A presents an exemplary photograph of an elastic diaphragm of an umbrella valve in a closed configuration, according to certain embodiments.
Figure 9B:
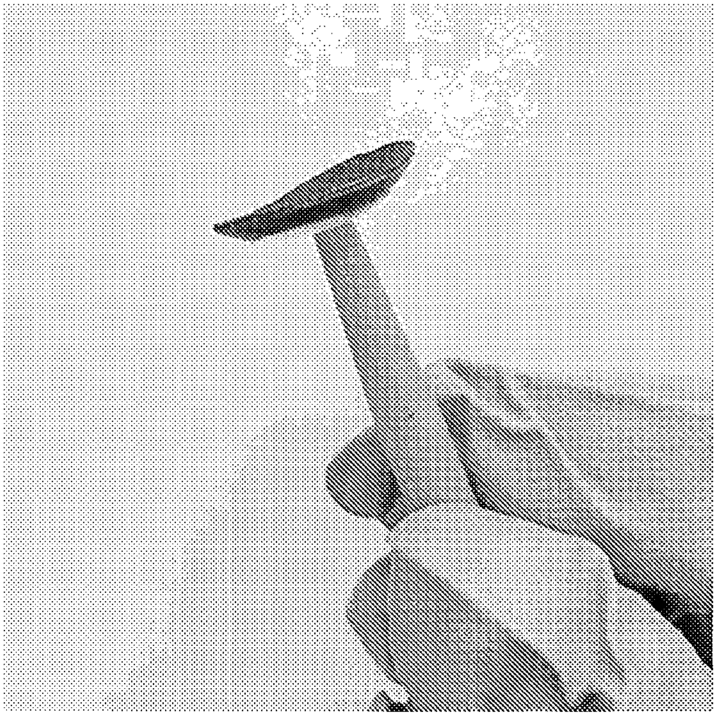
FIG. 9B presents an exemplary photograph of an elastic diaphragm of an umbrella valve in an open configuration, according to certain embodiments.

The exemplary elastic diaphragm was then placed on a holder, in a position that would correspond to a closed configuration of an umbrella valve, as shown in FIG. 9A. In FIG. 9B, a magnet (not shown) was brought closer to the exemplary elastic diaphragm, causing it to transition to an open configuration, as shown. This experiment demonstrates the viability of the exemplary elastic diaphragm for use in an umbrella valve.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt %" is an abbreviation of weight percentage. As used herein, "at %" is an abbreviation of atomic percentage.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A valve comprising:

an elastic diaphragm configured to move between an open configuration and a closed configuration, wherein at least a portion of the elastic diaphragm comprises a magnetic material, and wherein the elastic diaphragm is configured to transition from the closed configuration to the open configuration when a magnetic field applied to the elastic diaphragm is altered, wherein the elastic diaphragm includes one or more slits formed in the elastic diaphragm, wherein the one or more slits are configured to open when the elastic diaphragm is in the open configuration, and wherein, in the closed configuration, sides of the one or more slits are configured to be closely spaced relative to one another such that a liquid in contact with the one or more slits is unable to flow through the one or more slits due to surface tension.

2. The valve of claim 1, wherein the magnetic material comprises magnetic nanoparticles, and wherein the magnetic nanoparticles are uniformly dispersed in the elastic diaphragm.

3. The valve of claim 1, wherein the magnetic material comprises a ferromagnetic material, a ferrimagnetic material, a permanent magnetic material, and/or a paramagnetic material.

4. A system, comprising:

a vessel configured to contain a fluid;

a valve comprising an elastic diaphragm configured to move between an open configuration and a closed configuration in fluid communication with the vessel, wherein at least a portion of the elastic diaphragm comprises a magnetic material, and wherein the elastic diaphragm is configured to transition from the closed configuration to the open configuration when a magnetic field is applied to the elastic diaphragm; and a magnet configured to alter the magnetic field applied to the elastic diaphragm to transition the valve to the open configuration to permit the fluid to flow from the vessel through the valve, wherein the elastic diaphragm includes one or more slits formed in the elastic diaphragm, wherein the one or more slits are configured to open when the elastic diaphragm is in the open configuration, and wherein, in the closed configuration, sides of the one or more slits are configured to be closely spaced relative to one another such that a liquid in contact with the one or more slits is unable to flow through the one or more slits due to surface tension.

5. The system of claim 4, wherein the magnetic material comprises magnetic nanoparticles, and wherein the magnetic nanoparticles are uniformly dispersed in the elastic diaphragm.

6. The system of claim 4, wherein the magnetic material comprises a ferromagnetic material, a ferrimagnetic material, a permanent magnetic material, and/or a paramagnetic material.

7. The system of claim 4, further comprising an actuator operatively coupled to the magnet, wherein the actuator is configured to selectively move the magnet towards and away from the elastic diaphragm.

8. The system of claim 4, further comprising an actuator operatively coupled to the magnet, wherein the actuator is configured to change a current applied to an electromagnet.

9. The system of claim 4, wherein the magnet is a ring magnet.

10. A valve comprising:

an elastic diaphragm configured to move between an open configuration and a closed configuration, wherein at least a portion of the elastic diaphragm comprises a magnetic material, and wherein the elastic diaphragm is configured to transition from the closed configuration to the open configuration when a magnetic field applied to the elastic diaphragm is altered, wherein the elastic diaphragm includes one or more slits formed in the elastic diaphragm, and wherein the one or more slits are configured to open when the elastic diaphragm is in the open configuration; and a ring magnet configured to alter the magnetic field applied to the elastic diaphragm to transition the elastic diaphragm from the closed configuration to the open configuration.

11. The valve of claim 10, wherein the ring magnet is an electromagnet.

12. The valve of claim 11, further comprising an actuator configured to change a current applied to the electromagnet.

13. The valve of claim 10, wherein the ring magnet is a permanent magnet.

14. The valve of claim 13, further comprising an actuator configured to selectively move the magnet towards and away from the elastic diaphragm.

15. The valve of claim 10, wherein the magnetic material comprises magnetic nanoparticles, and wherein the magnetic nanoparticles are uniformly dispersed in the elastic diaphragm.

16. A system, comprising:

a vessel configured to contain a fluid;

a valve comprising an elastic diaphragm configured to move between an open configuration and a closed configuration in fluid communication with the vessel, wherein at least a portion of the elastic diaphragm comprises a magnetic material, and wherein the elastic diaphragm is configured to transition from the closed configuration to the open configuration when a magnetic field is applied to the elastic diaphragm; and a ring magnet extending around the vessel and configured to alter the magnetic field applied to the elastic diaphragm to transition the elastic diaphragm from the closed configuration to the open configuration to permit the fluid to flow from the vessel through the valve, wherein the elastic diaphragm includes one or more slits formed in the elastic diaphragm, and wherein the one or more slits are configured to open when the elastic diaphragm is in the open configuration.

17. The system of claim 16, wherein the ring magnet is an electromagnet.

18. The system of claim 17, further comprising an actuator configured to change a current applied to the electromagnet.

19. The system of claim 16, wherein the ring magnet is a permanent magnet.

20. The system of claim 19, further comprising an actuator configured to selectively move the magnet towards and away from the elastic diaphragm.

21. The system of claim 16, wherein the magnetic material comprises magnetic nanoparticles, and wherein the magnetic nanoparticles are uniformly dispersed in the elastic diaphragm.

* * * * *